Aug. 26, 1952  G. F. ROUSH  2,608,099
GYRO PRECESSING SYSTEM
Filed Jan. 31, 1948
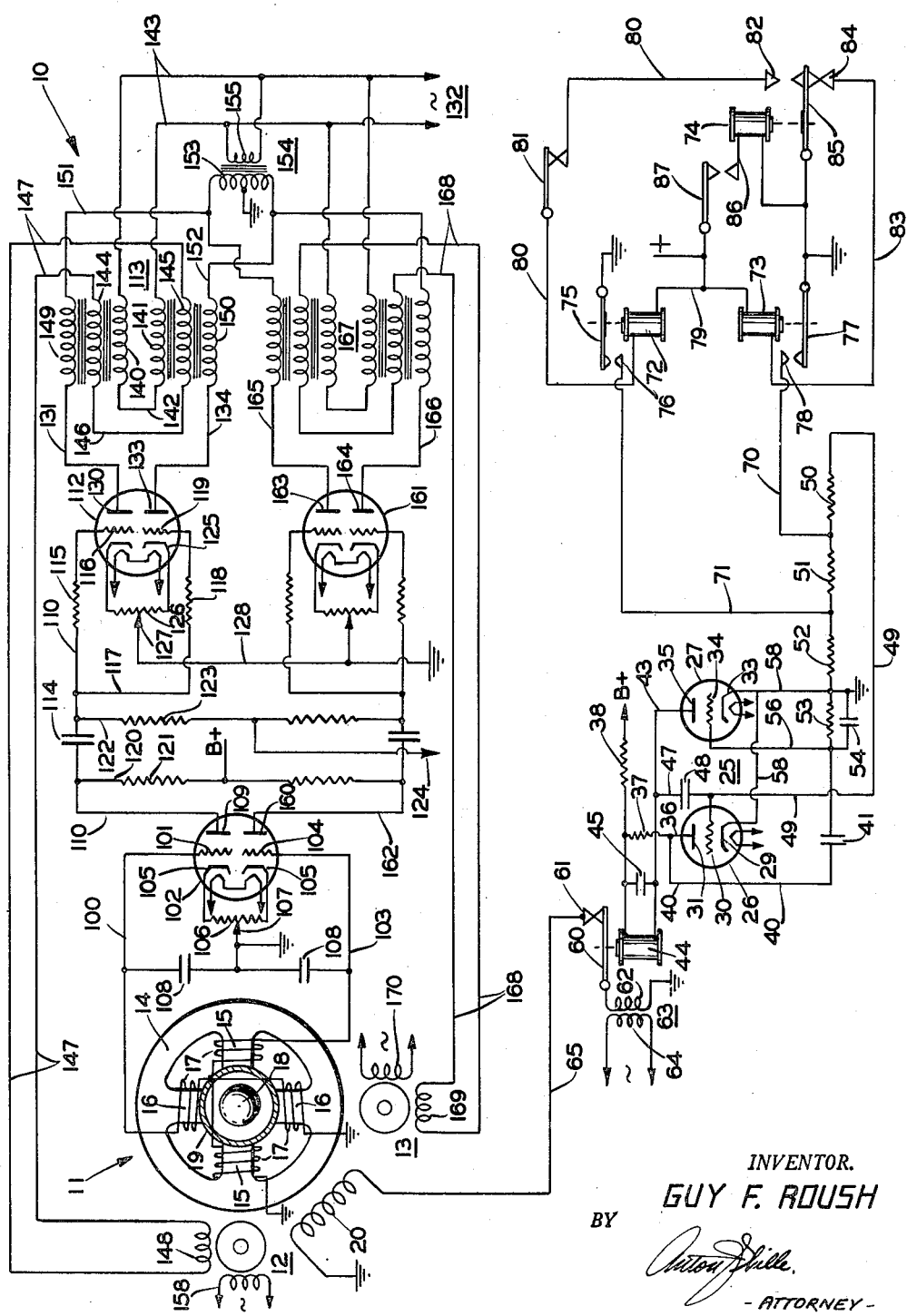
INVENTOR.
GUY F. ROUSH
BY
*Anton Hille*
- ATTORNEY -

Patented Aug. 26, 1952

2,608,099

UNITED STATES PATENT OFFICE 2,608,099

GYRO PRECESSING SYSTEM

Guy F. Roush, Montclair, N. J., assignor to Bendix Aviation Corporation, Teterboro, N. J., a corporation of Delaware Application January 31, 1948, Serial No. 5,539

14 Claims. (Cl. 74—5.47)

This invention relates to gyroscopes, and more particularly to a system for providing the necessary precessional torques to the gyroscope upon departure of the spin axis thereof from a reference axis.

An object of my present invention is to provide a gyro precessing system whereby torques are periodically applied to a gyroscope to return the spin axis thereof to a reference axis upon departure therefrom.

Another object of my invention is to provide a gyro precessing system of the general character indicated in which the torque applied thereto is in response to electrical signals, the phase and amplitude of the signals being dependent on the direction and extent of spin axis drift.

A further object of this invention is to provide a gyro precessing system of the character indicated in which the time intervals of applying the precessional forces to the gyroscope are varied to control the return rate of the spin axis to the reference axis upon departure therefrom.

Still another object of the present invention is to provide a gyro precessing system of the character indicated which shall consist of few and simple parts, relatively inexpensive to manufacture, positive and accurate in its operation, which shall have a large variety of applications and yet be practical and efficient to a high degree in use.

Other objects of this invention will in part be obvious, and in part hereinafter pointed out.

In the accompanying drawing forming a part of this specification in which one of the various possible illustrative embodiments of this invention is shown in a schematic wiring diagram, the numeral 10 designates a control circuit interconnecting a signal source 11 mounted on a gyrovertical (not shown) and two torque motors 12 and 13 adapted to apply a precessional torque about the major and minor axes of the gyroscope respectively, in response to the signals of said source.

The signal source 11 comprises a laminated ring core 14 of highly permeable material mounted concentrically with the spin axis of the gyroscope. Two pairs of poles 15 and 16 are provided, each having a winding 17 thereon and connected in pairs in series opposition. A rolling mass 18 is provided in the form of a steel ball, the movement thereof being limited upon departure of the spin axis of the gyroscope from its vertical position by a non-magnetic ring or cup 19. A circular energizing winding 20, here shown as a coil, is concentric with the core 14 and in inductive relation with the four windings thereon.

An energizing current flowing through the primary winding 20 will induce a voltage in each of the windings 17. Since a pair of the windings are connected in series opposed relation, the voltages induced in each pair of windings will cancel each other. When the spin axis of the gyroscope is in its vertical position, the ball 18 will be concentric with the spin axis and occupy a position midway between the poles 15 and 16. The flux linkages of the energizing coil 20 and the windings 17 will be unaffected by the mass of the ball; or if affected, the effects being equally distributed so that the voltages induced in the windings 17 are equal. Upon a departure of the spin axis from the vertical position the ball 18 will roll within the ring 19 to seek the lowermost position. The magnetic balance heretofore had is thus destroyed. The voltages induced in the windings 17 are no longer equal. A signal voltage will thus be provided by each of the pairs of coils equal to the algebraic sum of the two voltages. The phase of the signal voltage, as well as its amplitude will be dependent upon the proximity of the rolling mass to the poles. A signal voltage is thus obtainable dependent upon the departure of the spin axis from the axis of reference.

A current flowing through the energizing coil 20 will attract the steel ball 18 and will hold the same against the ring 19. The coil 20 is therefore intermittently energized to allow the magnetic field of the winding to decay permitting the ball to roll in response to the tilt of the gyro spin axis.

To this end, therefore, there is provided a relaxation oscillator circuit generally designated by the numeral 25 and comprising two triodes 26 and 27. The triode 26 comprises an indirectly heated cathode 29, a control grid 30 and a plate 31, while the triode 27 comprises a cathode 33, a control grid 34 and a plate 35. The plate 31 is connected by a lead 36 through resistors 37 and 38 to the B+ supply, and by a lead 40 to a condenser 41. The plate 35 of the triode 27 is connected by a lead 43 through the coil of a relay 44 and through the resistor 38 to the B+ supply, a condenser 45 being shunted across the relay coil. The plate 35 is further connected by the lead 43 and a lead 47 through a condenser 48 to the grid 30 of the tube 26. The grid 30 is further connected by a lead 49 through the series connected resistors 50, 51 and 52 to ground. A resistor 53 shunted by a condenser 54 is connected between ground and the grid 34 by a lead 56. The cathodes 29 and 33 of the two tubes are interconnected by a lead 58 to the junction of resistors 52, 53 and to ground.

A small positive charge on grid 30 will start the oscillations, the charge being amplified by both tubes 26 and 27 and a portion of the amplified voltage will be fed back to grid 30 via leads 43, 47 and condenser 48. The grid potential of tube 26 will suddenly rise to a positive value, while the grid voltage of tube 27, will suddenly go more negative than cut-off. Amplification will cease and momentarily one tube 26 will draw a heavy plate current while the other tube 27 draws no plate current. The leakage through the grid-leak resistances 50—53 will gradually bring the grid voltages back to normal at which point amplification will again take place, this time the grid 34 going positive and grid 30 negative.

The oscillations are determined by the values of the grid-leak resistances 50—53 and the grid condenser capacities 48 and 54. Changes in the frequency of the oscillations may therefore be made by grounding the resistors 50 and 51 as will hereinafter be described.

The relay coil 44 connected into the plate circuit of tube 27 controls a switch arm 60 normally engaging a stationary contact 61. The arm 60 is connected to the grounded secondary winding 62 of a transformer 63, the primary 64 of which is connected across a suitable source of alternating current supply. The fixed contact 61 is connected by a lead 65 through the energizing coil 20 of the signal source 11. The relay 44 is energized each time the plate 35 draws current in the cycle described. Energization of the relay will open the circuit of the energizing coil 20 to permit the ball to roll freely upon tilt of the gyro spin axis as herein described.

The frequency of the pulses applied to the energizing winding 20 is controlled by grounding the resistances 50 and/or 51 so that a predetermined erection rate may be obtained. While the grounding of these grid resistors may very readily be done by means of a multi-pole switch, I have provided a relay circuit to time the sequences in which the erection rates are varied.

To this end, the leads 70 and 71 connected to the resistors 50 and 51, respectively, are connected into a relay circuit comprising the relays 72, 73 and 74. The relay 72 controls a normally open switch arm 75 connected to ground and adapted to engage a fixed contact 76 connected to the lead 71. The relay 73 also controls a normally open switch arm 77 connected to ground and adapted to engage a fixed contact 78 connected to the lead 70. The relays 72 and 73 are connected by a lead 79 to plus power supply. The relay 72 is connected by a lead 80 through a normally closed switch 81 to a fixed contact 82 of relay 74. Relay 73 is further connected by a lead 83 to a second fixed contact 84 of the relay 74. A grounded switch arm 85 is adapted to engage the fixed contact 84, and disengage therefrom and engage the contact 82 upon energization of the relay 74. The relay 74 is of the time delay type and is connected to ground and by a lead 86 through a normally open switch 87 to plus power supply.

The relay circuit as illustrated in the accompanying drawing shows the relays 72 and 74 deenergized. The grid leak resistors 50, 51, and 52 are connected into the circuit of tube 26, while resistor 53 is connected into the circuit of tube 27. With the circuit connections as illustrated the energizing coil 20 is pulsed approximately 0.5 cps., giving an erection rate of about 2.5 degrees per minute.

The relay 74 will be energized upon closing the open switch 87. The relay 74 being of the time delay nature, will lift the switch arm 85 to engage the contact 82, after a time interval of perhaps five minutes. During this time interval, the switch arm 85 engaging the fixed contact 84 will complete an energizing circuit through the relay 73. The energized relay 73 will lift the switch arm 77 into engagement with the fixed contact 78 to ground the resistor 50 through the lead 70. The grid leak resistance of tube 26 now comprises the grounded resistor 50. The frequency of the oscillator circuit is thereby varied to provide an erection rate of 22.5 degrees per minute. Thus in starting the operation of the erection system for the gyro-vertical a comparatively large erection rate is provided.

After the time interval set for the relay 74 has elapsed, in which time the gyro will have been brought up to the desired speed and erected, relay 73 will be deenergized and relay 72 will be energized through the lead 80. Energization of the relay 72 will close the switch arm 75 and fixed contact 76 to ground resistors 50 and 51 through the lead 71. The grid leak resistance now in the circuit of the tube 26 comprises the two resistors 50 and 51. A smaller erection rate of approximately 8 degrees per minute is thus provided five minutes after the closing of switch 87. The erection rate provided is desirable under normal operating conditions.

From the circuit illustrated in the accompanying drawings, the opening of switch 81 will break the energizing circuit for the relay 72. Switch 81 is adapted to be opened by the gyroscope when the bank attitude exceeds 3 degrees to provide the minimum erection rate to avoid throwing the gyro-vertical off.

The intermittent signals induced in the pick-up windings 17 are impressed on an amplifier and phase discriminator section of the control circuit and thence applied to the respective torque motors 12 and/or 13.

The windings on poles 16 in alignment with the minor axis of the gyroscope are grounded at one end, and connected by a lead 100 to a control grid 101 of a double triode 102. The windings on poles 15 are connected by a lead 103 to the second control grid 104 of the tube 102. The indirectly heated cathodes 105 of the tube are interconnected by a resistor 106 provided with a grounded tap 107. Condensers 108 interconnecting leads 100 and 103 and the ground complete the input circuits for the tube 102.

The plate 109 of the tube 102 is connected by a lead 110 to a phase discriminator circuit comprising a duo-triode 112 and a magnetic reactor 113. The lead 110 is connected through a condenser 114 and a resistor 115 to the control grid 116, and by a lead 117 through a resistor 118 to the second control grid 119 of the tube 112. The plate 109 is further connected by the lead 110 and a lead 120, through a resistor 121 to B+ supply. The lead 110 is connected by a lead 122 through a resistor 123 to bias supply voltage 124.

The cathodes 125 of the tube 112 are interconnected by a resistor 126 having a variable tap 127 connected by a lead 128 to ground. The plate 130 of the tube is connected by a lead 131 through the magnetic reactor 113 to the power supply 132, while plate 133 of the tube is similarly connected by a lead 134 to the power supply.

The magnetic reactor 113 comprises a soft iron core (not shown) having two primary windings 140 and 141 thereon connected in series by a lead 142 and connected by leads 143 to the source of supply 132; and two secondary windings 144 and 145 connected in series opposition by a lead 146, the ends of windings 144 and 145 form the output of the reactor and are connected by the leads 147 to the variable phase 148 of the two phase induction motor 12. Saturating windings 149 and 150 are also provided on the core of the reactor and are connected by the respective leads 131 and 134 to the plates 130 and 133 of the tube 112. The other ends of the saturating windings are connected by the leads 151 and 152, respectively, to the secondary winding 153 of a transformer 154. The primary winding 155 of the transformer is connected across the leads 143 of the power supply 132.

The voltage applied to the plates 130 and 133 will be 180 degrees out-of-phase due to the grounded center-tap of the secondary winding of the transformer 154. The tube being biased to cut-off, the section of the tube which operates will depend upon the polarity of the amplified displacement signal impressed on the respective grids 116 and 119. With no signal on the control grids, no plate current will flow through the saturating windings 149 and 150 of the reactor 113. The voltage induced in the secondary windings 144 and 145 will be equal. The windings being connected in series opposed relation, the induced voltage in each winding will cancel each other, with the result that no current will flow in the output leads 147.

Upon departure of the gyro spin axis from the reference axis, assuming the departure to be in the correct plane, a displacement signal will be induced in the windings on poles 16. This displacement signal will thereupon be amplified by the upper section of tube 102 and applied to the grids of the tube 112. If we assume the spin axis departure was along the minor axis of the gyroscope and upward when viewing the drawings, we may assume the polarity of such a signal to be such as to operate the upper section of the discriminator tube 112. In this event, plate current will flow through the saturating winding 149 to saturate the core of the reactor 113. The inductive balance heretofore had is destroyed, permitting a current to flow in the output leads 147. The induction motor 12 having an energized phase 158 and the variable phase 148 now being momentarily energized, will operate to provide a torque impulse about the major axis of the gyroscope. The direction in which this torque is applied will depend upon the phase of the voltage applied across the variable phase 148 by the reactor 113. The phase of the reactor voltage will be, as already indicated, dependent upon the phase of the displacement signal induced in the pick-off windings on the minor poles 16.

If we assume the departure of the spin axis along the minor axis to be downward when viewing the drawing, the phase of the signal induced in the windings on poles 16 would be such as to operate the lower section of the tube 112 to reverse the output voltage polarity of the reactor 113 from that given in the example above. The motor 12 will therefore apply a precessional torque to the gyroscope which is also opposite in direction.

A departure of the gyro spin axis along the major axis of the gyroscope will induce a signal in the windings about the poles 15. This displacement signal will be amplified by the lower section of tube 102 and applied through similar circuits to the variable phase 169 of the motor 13. The plate 160 of the amplifier tube 102 of the major axis signal channel is connected in the same manner as plate 109 to a discriminator tube 161 by the plate lead 162. The plates 163 and 164 of the tube 161 are connected respectively by leads 165 and 166 to a magnetic reactor 167. The output leads 168 of the reactor 167 are connected across the variable phase 169 of the motor 13, while the fixed phase 170 of the motor is connected across a suitable power source. The operation of the major axis signal channel is the same as that described in connection with the minor axis of the gyroscope.

By adjustment of the grounded contact 127 on the cathode resistor 126 of the discriminator tube 112 the erection rate of the gyroscope spin axis from a certain departure along the minor axis thereof may be equalized, and similarly the erection rate of the spin axis from a departure along the major axis may be equalized by adjusting the grounded contact of the corresponding cathode resistor of tube 161. The adjustment of the grounded contact 107 on cathode resistor 106 of tube 102 may then be made to equalize the erection rate in the major and minor axes.

It will be apparent in the examples given, that the departure of the gyroscope spin axis may be in planes other than those indicated. The rolling ball 18 will vary the impedance of both magnetic circuits to cause a displacement signal to be induced in each pair of the windings on poles 15 and 16. Both channels of the control circuit 10 will thus be operated to provide momentary torques about both of the gyroscope axes.

In resumé then, there is provided intermittent displacement signals upon departure of the gyroscope spin axis from the reference axis. The intermittent signals are provided by the pulsing of the energizing winding 20 upon operation of the relaxation oscillator 26, 27, and the change in impedance of the magnetic circuit linking the energizing winding 20 and the pick-off windings 17 by the rolling ball 18. The time off and time on of the pulsing circuit for the energizing winding 20 may be controlled by the operation of the relays 74 and 72, 73 in changing the grid leak resistances of the oscillator circuit.

The intermittent displacement signals thus provided are amplified by the tube 102. A phase discriminator circuit 112, 161 then separates the amplified displacement signals according to phase and through a magnetic reactor 113, 167, applies a voltage to the torque producing motors 12 and 13 to provide the precessional impulses to the gyroscope about the proper axis thereof.

There is thus provided a novel gyro precessing system in which the several objects of this invention are achieved and which is well adapted to meet the conditions of practical use.

As various embodiments may be made of the above invention, and as various changes may be made in the embodiment above set forth, it will be understood that all matter herein set forth, or shown in the accompanying drawing is to be interpreted as illustrative and not in a limiting sense.

Having thus described my invention, I claim as new and desire to secure by Letters Patent:

1. A gyro precessing system comprising a gyroscope, means on said gyroscope adapted to develop intermittent signal voltages upon departure of the gyroscope spin axis from a reference axis, a balanced circuit comprising inductive means adapted to be unbalanced by said signal voltages, and means operative upon the unbalance of said circuit to intermittently precess said gyroscope.

2. A gyro precessing system comprising a gyroscope, an inductive element on said gyroscope adapted to develop an intermittent signal voltage upon departure of the gyroscope spin axis from a reference axis, a balanced circuit comprising inductive means adapted to be unbalanced by said signal voltage, and means operative upon the unbalance of said circuit to provide intermittent precessing torques to said gyroscope.

3. A gyro precessing system comprising a gyroscope, an inductive element on said gyroscope adapted to be intermittently energized to develop intermittent signal voltages upon departure of the gyroscope spin axis from a reference axis, a balanced circuit comprising inductive means adapted to be unbalanced by the intermittent signal voltages, means operative upon an unbalance of said circuit to precess said gyroscope, and means for varying the rate at which said element is intermittently energized.

4. A gyro precessing system comprising a gyroscope, an inductive element on said gyroscope adapted to be intermittently energized to develop signal voltages responsive to the departures of the gyroscope spin axis from a reference axis, a balanced circuit comprising inductive means adapted to be unbalanced by said signal voltages to precess said gyroscope, means for varying the rate at which said element is intermittently energized, and means for providing a timed sequence in varying the energization rate of said element.

5. A gyro precessing system comprising a gyroscope, an inductive element on said gyroscope, a delay oscillator intermittently energizing said element to provide intermittent signal voltages upon tilt of the gyroscope spin axis from its vertical position, a balanced circuit comprising inductive means adapted to be unbalanced by said signal voltages and a motor connected to said inductive means and operative upon an unbalance of said circuit to apply a precessing torque to the gyroscope.

6. A gyro precessing system comprising a gyroscope, an inductive element on said gyroscope, a relaxation oscillator intermittently energizing said inductive element to provide intermittent signal voltages responsive to the tilt of the gyroscope spin axis from its vertical position, a magnetic reactor whose reactance varies in accordance with said signal voltages, and means responsive to reactance change of said magnetic reactor to apply an erecting torque to said gyroscope.

7. A gyro precessing system comprising a gyroscope, an inductive element on said gyroscope, a relaxation oscillator intermittently energizing said inductive element to provide intermittent signal voltages responsive to the tilt of the gyroscope spin axis from its vertical position, means for varying the impedance of the grid circuit of said oscillator to vary the energization rate of said inductive element, a magnetic reactor whose reactance varies in accordance with said signal voltages, and means responsive to reactance change of said magnetic reactor to apply an erecting torque to said gyroscope.

8. A gyro precessing system comprising a gyroscope, an inductive element on said gyroscope, a relaxation oscillator intermittently energizing said inductive element to provide intermittent signal voltages responsive to the tilt of the gyroscope spin axis from its vertical position, means for varying the impedance of the grid circuit of said oscillator to vary the energization rate of said inductive element, a relay circuit for timing the sequence in which the impedance of the grid circuit is varied, a magnetic reactor whose reactance varies in accordance with said signal voltages, and means responsive to reactance change of said magnetic reactor to apply an erecting torque to said gyroscope.

9. A gyro precessing system comprising a gyroscope, an inductive element on said gyroscope, a relaxation oscillator intermittently energizing said inductive element to provide intermittent signal voltages responsive to the tilt of the gyroscope spin axis from its vertical position, means for varying the grid-leak resistance of said oscillator to vary the energization rate of said inductive element, a relay circuit for timing the sequence in which the grid leak resistance is varied, a magnetic reactor whose reactance varies in accordance with said signal voltages, and means responsive to reactance change of said magnetic reactor to apply an erecting torque to said gyroscope.

10. A gyro precessing system comprising a gyroscope, an inductive element adapted to develop a signal in response to the tilt of the gyroscope spin axis from its vertical position, a balanced circuit comprising inductive means responsive to said signals and unbalanced thereby, means responsive to the unbalance of said circuit to apply an erecting torque to said gyroscope, means for varying the erection rate of said gyroscope, and means for timing the sequence of the erection rates.

11. A gyro precessing system comprising a gyroscope, an inductive element on said gyroscope, means for intermittently energizing said inductive element to provide intermittent signal voltages responsive to the tilt of the gyroscope spin axis from its vertical position, means responsive to said intermittent signals to provide erecting torque impulses to said gyroscope, means for varying the energization rate of said element to provide different erection rates for said gyroscope, said last means including a switch operative upon deviation of the gyroscope spin axis from the vertical axis a greater degree than a predetermined maximum to provide a minimum erection rate for the gyroscope.

12. A gyro precessing system comprising a gyroscope, an inductive element on said gyroscope, means for intermittently energizing said inductive element to provide intermittent signal voltages responsive to the tilt of the gyroscope spin axis from its vertical position, means responsive to said intermittent signals to provide erecting torque impulses to said gyroscope, means for varying the energization rate of said element to provide different erection rates for said gyroscope, said last means including a switch operative upon deviation of the gyroscope spin axis from the vertical axis a greater degree than a predetermined maximum to provide a minimum erection rate for the gyroscope, and means for timing the sequence of the erection rate of said gyroscope.

13. A gyro precessing system comprising a gyroscope, means on said gyroscope for developing intermittent signal voltages upon departure of the gyroscope spin axis from a predetermined attitude, means responsive to the signal voltages to intermittently precess said gyroscope, and means for varying the rate at which said responsive means is energized to control the erection rate of the gyroscope.

14. A gyro precessing system comprising a gyroscope, means on said gyroscope for developing intermittent signal voltages upon departure of the gyroscope spin axis from a predetermined attitude, means responsive to the signal voltages to intermittently precess said gyroscope, and means for varying the rate at which said responsive means is energized to control the erection rate of the gyroscope according to a timed sequence.

GUY F. ROUSH.

REFERENCES CITED

The following references are of record in the file of this patent:

UNITED STATES PATENTS

| Number    | Name            | Date           |
|-----------|-----------------|----------------|
| 1,763,806 | Methvin         | June 17, 1930  |
| 1,972,882 | Gillmor         | Sept. 11, 1934 |
| 2,382,993 | Haskins         | Aug. 21, 1945  |
| 2,392,370 | Esval et al.    | Jan. 8, 1946   |
| 2,456,619 | Curry, Jr., et al. | Dec. 31, 1948 |
| 2,473,516 | Fragola et al.  | June 21, 1949  |